(12) United States Patent
Tanaka et al.

(10) Patent No.: US 6,251,522 B1
(45) Date of Patent: Jun. 26, 2001

(54) FULLERENE-CONTAINING STRUCTURE AND PROCESS FOR PRODUCING THE SAME

(75) Inventors: Shun-ichiro Tanaka; Bingshe Xu, both of Yokohama (JP)

(73) Assignees: Japan Science and Technology Corporation, Kawaguchi; Kabushiki Kaisha Toshiba, Kawasaki, both of (JP)

(*) Notice: Subject to any disclaimer, the term of this patent is extended or adjusted under 35 U.S.C. 154(b) by 0 days.

(21) Appl. No.: 09/381,736

(22) PCT Filed: Mar. 20, 1998

(86) PCT No.: PCT/JP98/01206

§ 371 Date: Dec. 23, 1999

§ 102(e) Date: Dec. 23, 1999

(87) PCT Pub. No.: WO98/42619

PCT Pub. Date: Jan. 10, 1998

(30) Foreign Application Priority Data

Mar. 24, 1997 (JP) ................................... 9-069426

(51) Int. Cl.⁷ ................................................. C01B 31/02
(52) U.S. Cl. .................... 428/408; 423/445 B; 427/532; 427/551; 427/552; 427/577; 427/249
(58) Field of Search ...................... 428/408; 423/445 B; 427/532, 551, 552, 577, 249

(56) References Cited

U.S. PATENT DOCUMENTS 5,543,378 * 8/1996 Wang ................................ 423/445 B 5,919,429 * 7/1999 Tanaka et al. ................... 423/445 B

FOREIGN PATENT DOCUMENTS

| 0 808 682 | 11/1997 | (EP) . |
| 8-217431 | 8/1996 | (JP) . |
| 9-309712 | 12/1997 | (JP) . |

OTHER PUBLICATIONS

Mater. Res. Soc. Proc., vol. 472 (1997), pp. 179–184 (No Month).

* cited by examiner

*Primary Examiner*—Archene Turner
(74) *Attorney, Agent, or Firm*—Finnegan, Henderson, Farabow, Garrett & Dunner, L.L.P.

(57) ABSTRACT

A fullerene containing structure comprises an amorphous carbon base having a first amorphous carbon layer and a second amorphous carbon layer laminated together, and a giant fullerene formed in the neighborhood of layer interface of the amorphous carbon base straddling on both the amorphous carbon layers. A plurality of giant fullerenes generated in the neighborhood of the layer interface are connected together to form a continuum body such as a film structure (a film of giant fullerene) or the like. According to such the fullerene containing structure, a shape and a position to be formed of the giant fullerene, further a state of formation such as a connecting structure or the like can be controlled. In addition, the stable carbon base can protect the generated giant fullerene itself.

20 Claims, 2 Drawing Sheets

FULLERENE-CONTAINING STRUCTURE AND PROCESS FOR PRODUCING THE SAME

TECHNICAL FIELD

The present invention relates to a fullerene containing structure in which fullerene is formed in an amorphous carbon base and a manufacturing method of the same.

BACKGROUND ART

A fullerene that is typical in $C_{60}$ is bonded through Van der Waals force and has a football like shape of high symmetry. All the carbon atoms in one molecule are equivalent and bonded through covalent bond to each other to form a very stable crystal. Fullerenes such as $C_{60}$ or the like can be considered to take a fcc structure crystallographically, accordingly they show metal like mechanical properties such as plastic deformation, work hardening or the like. Based on such properties, as a new carbon-based material, various applications of the fullerenes are expected. In addition, based on the properties of the fullerene itself, applications in superconducting material, catalytic material, lubricant material, bio-material, non-linear optics material or the like are being studied.

So far, the fullerenes such as $C_{60}$ has been prepared by arc discharge method that utilizes a carbon rod or particulate carbon as an electrode, or by laser ablation method in which a beam of UV laser is irradiated on surface of graphite. Since fullerenes are formed in soot mixed therein, they are extracted by the use of a collector that employs a filter, benzene or the like.

In the material piled up at a cathode side during the above described arc discharge, there are included fullerenes of higher order (giant fullerene) called such as carbon nano-capsule or carbon nano-tube. After crushing the material piled up at the cathode side, they can be obtained by refining with an organic solvent such as ethanol or the like. Both the carbon nano-capsule and carbon nano-tube has a hollow structure. By encapsulating another metallic atom or a micro-crystallite in the hollow inside of such a giant fullerene, synthesis of a new material or search of a new function is being carried out.

As a giant fullerene in which another metallic atom or a micro-crystallite is encapsulated in the hollow inside of the carbon nano-capsule or carbon nano-tube (hereinafter refer to as an endohedral giant fullerene), ones in which fine particles of carbides of rare earth metals such as La, Y or the like, or fine metallic particles of Fe, Co, Ni or the like are encapsulated have been reported. These are prepared by use of the arc discharge method with a carbon electrode that includes powder of a metal or an oxide, and by refining thereafter the endohedral giant fullerene included in the deposits piled up at the cathode.

As one kind of the giant fullerene, substances called an onion-like graphite in which fullerenes of larger molecular weight are superposed concentrically outside of a core consisting of $C_{60}$ or the like to form external shells have been discovered. It is being studied to prepare an endohedral giant fullerene by use of such an onion-like graphite. The endohedral giant fullerenes, based on their properties, are expected to apply in device materials such as material for electronic parts, sensor material, filter material or the like, and new functional materials such as superconducting material, bio-material, medical material or the like.

The conventional giant fullerenes or endohedral giant fullerenes, however, are included in the deposit that is produced by the arc discharge method as described above. Accordingly, they can be separated with difficulty from impurities such as graphite like substance or amorphous carbon. In the endohedral giant fullerene, there is a problem that shape or state of encapsulation can not be easily controlled. Further, fine particles being encapsulated in the giant fullerene are restricted, at present, to particular metallic particles or compound particles.

In particular, when considering an application of the giant fullerenes or endohedral giant fullerenes in a device or a new functional material, it is important to enable to control the magnitude of a single giant fullerene or the position where the giant fullerene itself is formed. In addition, the state of formation of the giant fullerenes such as state of connection between the giant fullerenes or structures thereof is also important to be controlled. However, the conventional manufacturing method does not allow controlling them easily.

In addition, since the giant fullerene is unstable substance, some means is required to implement to protect the generated giant fullerene. However, at the present time, such a technology has not been found.

An object of the present invention is to provide a fullerene containing structure that allows to control the shape or the positions to be formed together with the state of formation such as the connecting structure or the like with a relatively simple process, and that protects the generated fullerenes with a stable substance, and to provide a manufacturing method thereof.

DISCLOSURE OF THE INVENTION

A first fullerene containing structure of the present invention comprises an amorphous carbon base having a first amorphous carbon layer and a second amorphous carbon layer laminated together, and a fullerene formed in the neighborhood of the layer interface of the first amorphous carbon layer and the second amorphous carbon layer and straddled the first and second amorphous carbon layers.

A second fullerene containing structure of the present invention comprises an amorphous carbon base material having a first amorphous carbon layer and a second amorphous carbon layer laminated together, and a plurality of fullerenes formed in the neighborhood of layer interface of the first amorphous carbon layer and the second amorphous carbon layer and straddled the first and second amorphous carbon layers.

The second fullerene containing structure further comprises a plurality of fullerenes that are connected together.

A manufacturing method of a first fullerene containing structure of the present invention comprises a step of disposing an ultra-fine particle on a first amorphous carbon layer, a step of laminating a second amorphous carbon layer on the first amorphous carbon layer so as to cover at least the ultra-fine particle, and a step of irradiating a high energy beam onto a laminate body of the first amorphous carbon layer and the second amorphous carbon layer having the ultra-fine particle at the layer interface of the first and second amorphous carbon layer, and generating a fullerene traversing the first and second amorphous carbon layers with the ultra-fine particle as nucleation substance.

A manufacturing method of a second fullerene containing structure of the present invention comprises a step of disposing a plurality of ultra-fine particles on a first amorphous carbon layer, a step of laminating a second amorphous carbon layer on the first amorphous carbon layer so as to cover a plurality of the ultra-fine particles, and a step of irradiating a high energy beam onto a laminate body of the first amorphous carbon layer and the second amorphous carbon layer having the ultra-fine particles at the layer interface of the first and second amorphous carbon layer, and generating a plurality of fullerenes traversing the first and second amorphous carbon layer with the ultra-fine particles as nucleation substance.

The manufacturing method of the second fullerene containing structure further comprises a step of further irradiating a high energy beam on a plurality of the fullerenes that are generated to grow and connect a plurality of the fullerenes to each other.

The present invention is based on findings that, by irradiating a beam of high energy onto an amorphous carbon base material of laminated structure at the layer interface of which ultra-fine particles exist, a fullerene such as an ultra-fine particle endohedral giant fullerene or the like that traverses the respective amorphous carbon layers can be formed with the ultra-fine particles as the nucleation substance with reproducibility, and, by irradiating further a beam of high energy on the fullerene that is generated, the obtained fullerenes can grow and connect each other to be a continuous structure.

As described above, in a fullerene containing structure of the present invention, a fullerene (includes a fullerene of a continuous structure) is formed in an amorphous carbon base material of lamination structure. The amorphous carbon base material can function as, for instance, a protecting material. The fullerenes in the amorphous carbon base material are formed according to initial positions of the ultra-fine particles, accordingly the positions of formation thereof or the shapes can be controlled. Further, without restricting to the positions or the shapes of the fullerenes, the continuous structure or the like of the fullerene can be controlled. For instance, the fullerene of continuous structure such as a film structure or a desired pattern can be obtained. Thus, according to the present invention, various kinds of controls or operations of the fullerenes can be realized.

MODE FOR CARRYING OUT THE INVENTION

Figure 1A:
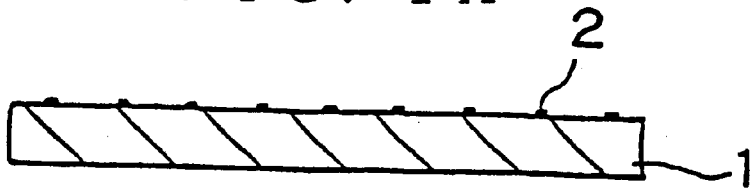
FIG. 1A, FIG. 1B, FIG. 1C, FIG. 1D and FIG. 1E are cross-sections showing schematically manufacturing processes according to one embodiment of a fullerene containing structure of the present invention.

In the following, embodiments for carrying out the present invention will be described.

FIG. 1A, FIG. 1B, FIG. 1C, FIG. 1D and FIG. 1E are cross-sections showing schematically one embodiment of manufacturing processes of a fullerene containing structure (a giant fullerene containing structure) of the present invention. In these figures, reference numeral 1 denotes an amorphous carbon support film as a first amorphous carbon layer. For the amorphous carbon support film 1, an i-carbon, for instance, can be employed. The amorphous carbon support film 1 is not particularly restricted but is preferable to be a thin film base material of a thickness of approximately from 5 to 100 nm. Further, it is desirable to employ a thin film base material of a thickness of approximately from 10 to 50 nm.

First, as shown in FIG. 1A, on an amorphous carbon support film 1, ultra-fine particles 2 that are a nucleation substance during generation of a giant fullerene are disposed. Further, in FIG. 1, a plurality of ultra-fine particles 2 is disposed on the amorphous carbon support film 1. However, the ultra-fine particles are only necessary disposing according to a pattern of a giant fullerene containing structure to be formed, and the number of disposed ultra-fine particles 2 is not particularly restricted. Only one ultra-fine particle 2 may be disposed on the amorphous carbon support film 1.

As the ultra-fine particle to be a nucleating substance, an ultra-fine particle consisting of various kinds of solid material such as metallic ultra-fine particle, semiconductor ultra-fine particle, compound ultra-fine particle or the like can be employed. In other words, with an ultra-fine particle 2 consisting of various kinds of solid substance as a nucleation substance (nucleus formation point), as will be described later, a giant fullerene can be induced and grown.

As specific examples of the ultra-fine particle 2, metallic ultra-fine particle consisting of various kinds of single metals such as Pt, Au, Cu, Al, Sn, Nb, Mo, W or the like and of alloys thereof, semiconductor ultra-fine particle consisting of Si, Ga, As or the like, ultra-fine particle of metal oxide such as LaO, $Al_2O_3$, ZnO, Pb (Zr, Ti) $O_3$(PZT), (Pb, La) (Zr, Ti)$O_3$(PLZT) or the like, further various kinds of compound ultra-fine particle of metallic halide, metallic fluoride, metallic boride or the like can be cited. When a plurality of ultra-fine particles 2 are disposed, a plurality of kinds of ultra-fine particles of different materials can be employed. For instance, metallic ultra-fine particles of two or more kinds of different materials, or a metallic ultra-fine particle and a compound ultra-fine particle can be disposed.

The size of the ultra-fine particle 2 is only necessary to be one that can provide a nucleation point during generation of a giant fullerene. In specific, it is preferable to employ the ultra-fine particle 2 of a diameter of approximately from 1 to 100 nm. Incidentally, the ultra-fine particle 2 of a diameter of 1 nm or less, in addition to being difficult in existence and manufacturing, is not likely to exhibit fully its function as the nucleation point of a giant fullerene. The more preferable diameter of the ultra-fine particle 2 is in the range of from 1 to 40 nm.

A manufacturing method of such the ultra-fine particles 2 is not particularly restricted. If it is possible to dispose in separated state on the amorphous carbon support film 1, the ultra-fine particles 2 manufactured according to the various methods can be employed.

For instance, a target having a plurality of fine holes or slits is disposed on an amorphous carbon support film 1. A beam of high energy such as an Ar ion beam or the like is irradiated obliquely onto inner walls of the fine holes or the slits of the target to liberate constituent atoms or molecules out of the target. Thereby, the ultra-fine particles consisting of the constituent material of the target can be obtained. With such the method (hereinafter, refers to as transcription method), depending on the shape of the fine holes or slits formed on the target, the size of the ultra-fine particle or the position being disposed thereof can be controlled.

Further, metastable compound particles such as $\theta\text{-}Al_2O_3$ particles or the like disposed on the amorphous carbon support film 1, through bombardment of a beam of high energy such as an electron beam or the like, can be converted into $\alpha\text{-}Al_2O_3$ particles or Al ultra-fine particles of stable phase. This method (hereinafter refers to as a compound decomposition method) is particularly effective for W, Mo, Nb, Cu or the like of which compound, oxide in particular, is likely to decompose.

The disposition shape of ultra-fine particles 2 is decided according to an aimed giant fullerene containing structure. When a giant fullerene of a single structure is formed, the disposition shape of the ultra-fine particles 2 is not particularly restricted. However, when a plurality of giant fullerenes are formed or a plurality of the generated giant fullerenes are connected together to be a continuous structure, the ultra-fine particles 2 are disposed according to the shape being aimed.

Figure 2A:
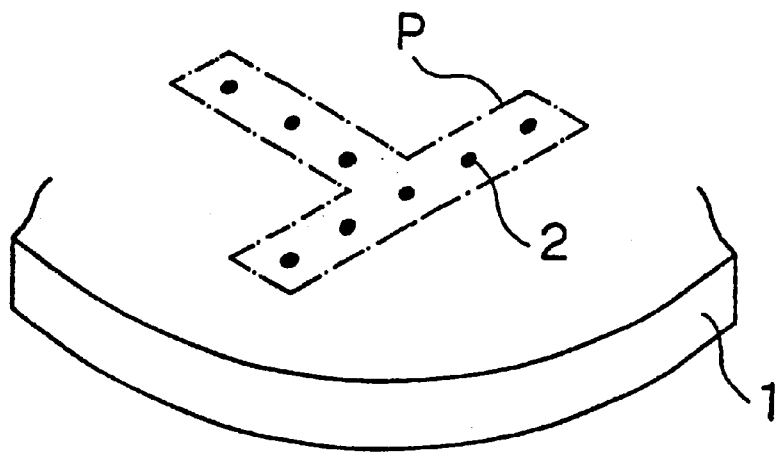
FIG. 2A, FIG. 2B and FIG. 2C are cross-sections showing schematically manufacturing processes according to another embodiment of a fullerene containing structure of the present invention.

For instance, when a plurality of giant fullerenes are connected together to be a film structure, as shown in FIG. 1A, on a whole surface or a prescribed area of an amorphous carbon support film 1, a plurality of ultra-fine particles 2 are dispersed. In addition, when a plurality of giant fullerenes are connected together to form a desired pattern, for instance as shown in FIG. 2A, on a surface of the amorphous carbon support film 1, according to a pattern P to be formed by connecting a plurality of giant fullerenes, a plurality of ultra-fine particles 2 are disposed. A distance between a plurality of the ultra-fine particles 2 is determined considering the state of growth of the giant fullerenes or the like.

Figure 1B:
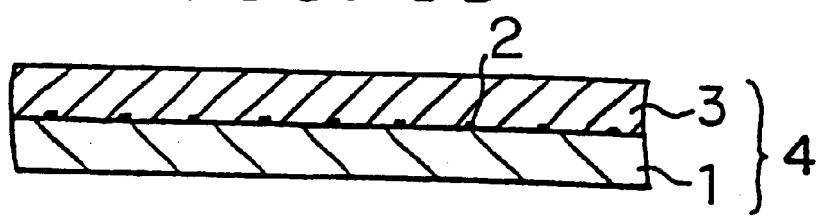
Figure 2B:
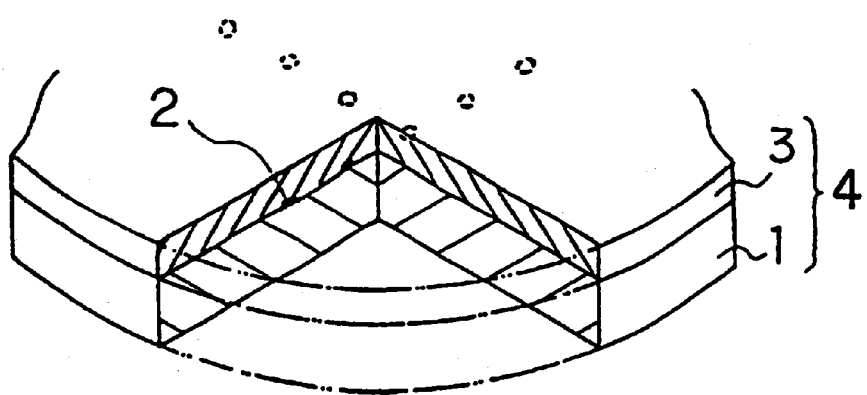

Next, as shown in FIG. 1B and FIG. 2B, on an amorphous carbon support film 2 thereon a plurality of ultra-fine particles 2 are disposed, so as to cover at least the respective ultra-fine particles 2, an amorphous carbon film 3 is laminated as a second amorphous carbon layer. For the amorphous carbon film 3, i-carbon or the like can be employed as identical as in the case of the amorphous carbon support film 1. That is, with the amorphous carbon support film 1 as the first amorphous carbon layer and the amorphous carbon film 3 as the second amorphous carbon layer, an amorphous carbon base material (laminated amorphous carbon base material) 4 of laminated structure at the interface of which a plurality of ultra-fine particles 2 exist is formed.

A thickness of the amorphous carbon film 3 needs only be one that is capable of inducing and growing a giant fullerene through activation of amorphous carbon located in the surrounding of the ultra-fine particles 2 when a beam of high energy is irradiated from the above thereof. The specific thickness of the amorphous carbon film 3 is preferable to be approximately 5 to 100 nm.

When the thickness of the amorphous carbon film 3 is less than 5 nm, the amount of carbon necessary for growing a giant fullerene is not likely to be supplied sufficiently.

On the other hand, when the thickness exceeds 100 nm, a beam of high energy irradiated from the above thereof is attenuated in the amorphous carbon film 3 to be likely not to activate fully the carbon surrounding the ultra-fine particles 2. In particular, when a plurality of giant fullerenes that are induced are connected together to be a continuous structure, in order for the giant fullerenes to grow to be capable of connecting together in the laminated amorphous carbon base material 4, the thickness of the amorphous carbon film 3 is set at 5 nm or more. The thickness of the amorphous carbon film 3 in this case differs according to a distance disposing the plurality of ultra-fine particles 2.

A method of formation of an amorphous carbon film 3 is only necessary to be one that can provide a sufficient contact state with the amorphous carbon supporting film 1. For instance, generally used methods of thin film formation such as vapor evaporation method, laser ablation method, sputtering method, CVD method or the like can be employed. In particular, when the ultra-fine particles 2 are formed in a vacuum atmosphere or the like, it is desirable to employ a film formation method capable of forming an amorphous carbon film 3 continuously without destroying the atmosphere. Thereby, without altering the state of the ultra-fine particles 2, the ultra-fine particles can be encapsulated at the layer interface of the laminated amorphous carbon base material 4.

Figure 1C:
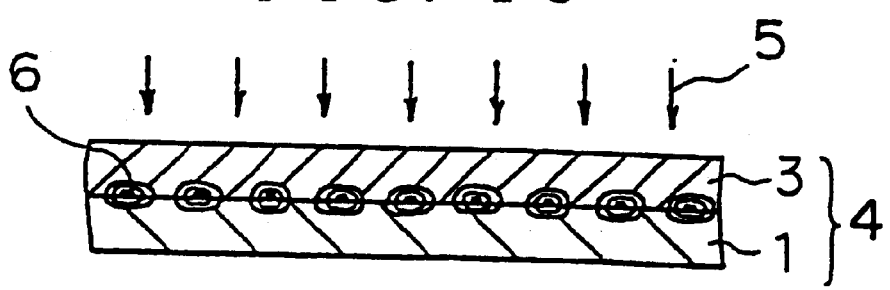

Next, as shown in FIG. 1C, onto the laminated amorphous carbon base material 4 at the layer interface thereof the ultra-fine particles 2 exist (being encapsulated), from the above of the amorphous carbon film 3, a beam 5 of high energy is irradiated. The beam of high energy that is irradiated is not restricted to a particular one. It is only necessary to be one that has enough energy capable of activating amorphous carbon existing in the surrounding of the ultra-fine particles 2 to induce a giant fullerene. For instance, an electron beam of an intensity of $1 \times 10^{19}$ e/$cm^2 \cdot sec$ or more, a beam of particles such as an ion beam, photon such as laser, X rays, γ rays, a beam of neutron or the like having an intensity as identical as that of the electron beam can be employed.

In the case of an electron beam being employed as the beam 5 of high energy, when an intensity of irradiation is less than $1 \times 10^{19}$ e/$cm^2 \cdot sec$, the amorphous carbon in the surroundings of the ultra-fine particles 2 that exist in the laminated amorphous carbon base material 4 is not likely to be activated to form giant fullerenes. In other words, an electron beam having an intensity of $1 \times 10^{19}$ e/$cm^2 \cdot sec$ or more, though depending on the thickness of the amorphous carbon film 3, brings about an activation effect of the ultra-fine particles 2 and amorphous carbon in the surrounding thereof, a local heating effect or the like. Thereby, the giant fullerenes are formed. As the beam 5 of high energy, the particle beam, photons, X rays, γ rays, neutron beam or the like can be employed as identical.

The atmosphere in which the beam 5 of high energy is irradiated is only necessary to be set according to the beam to be employed. For instance, an inert atmosphere such as a vacuum atmosphere, an Ar atmosphere or the like can be cited. For instance, when an electron beam is irradiated, a vacuum atmosphere of $1 \times 10^{-5}$ Pa or less is desirable to be employed. By employing such a vacuum atmosphere, atoms of residual gas can be prevented from being absorbed. This enhances formation of giant fullerenes.

When such beam 5 of high energy as that is described above is irradiated on an area where the ultra-fine particles 2 exist from the above of the amorphous carbon film 3, as shown in FIG. 1C, the amorphous carbon existing in the area being irradiated by the beam 5 of high energy is activated to induce a giant fullerene 6 with the ultra-fine particle 2 existing at the layer interface as a nucleation point. The ultra-fine particles 2 function effectively as the nucleation points and the irradiated beam 5 of high energy causes an activation effect and a local heating effect of the amorphous carbon existing in the surroundings of the ultra-fine particles. Thereby, the giant fullerenes 6 are induced.

Thus, the beam 5 of high energy is irradiated on the laminated amorphous carbon base material 4 at which layer interface the ultra-fine particles 2 exist. Thereby, the giant fullerene 6 formed traversing over the amorphous carbon support film 1 and the amorphous carbon film 3 can be obtained. In other words, in the laminated amorphous carbon base material 4, the giant fullerene 6 is induced. As a giant fullerene 6 that is induced, onion-like graphite can be cited. The ultra-fine particle 2 that is used as the nucleation substance is basically encapsulated in a hollow core area of the giant fullerene 6. Accordingly, the obtained giant fullerene 6 can be said an ultra-fine particle endohedral giant fullerene.

The giant fullerenes 6 are induced according to the initial disposition positions of the ultra-fine particles 2. That is, at the prescribed positions in the laminated amorphous carbon base material 4, a single giant fullerene or a plurality of giant fullerenes 6 independent each other can be obtained. The size or the like of the obtained giant fullerenes 6 can be controlled through the intensity or the irradiation period of the high energy beam 5.

Accordingly, the giant fullerene 6 such as the ultra-fine particle endohedral giant fullerene is made capable of controlling or operating the position of formation and the size. In addition, the laminated amorphous carbon base material 4 can be made function as the protective member of the giant fullerene 6. This has a tremendous effect for stabilization of the giant fullerene 6. Further, as the ultra-fine particle 2 to be used as the nucleation substance, as described above, various kinds of solid materials can be used. Accordingly, giant fullerenes 6 in which the ultra-fine particles 2 consisting of various kinds of materials are included, that is, ultra-fine particle endohedral giant fullerenes can be obtained.

Incidentally, during irradiation of the beam 5 of high energy, the laminated amorphous carbon base material 4 may be maintained at room temperature. That is, the giant fullerene 6 can be formed on the room temperature stage that can be controlled in temperature thereof.

The process so far is one that forms a single giant fullerene 6 or a plurality of giant fullerenes 6 independent of each other. By further irradiating the beam 5 of high energy against the laminated amorphous carbon base material 4 in which a giant fullerene 6 is induced, the giant fullerene 6 grows further. In this case, a simultaneous growth of a plurality of the giant fullerenes 6 can cause a structure in which they are connected together.

Figure 1D:
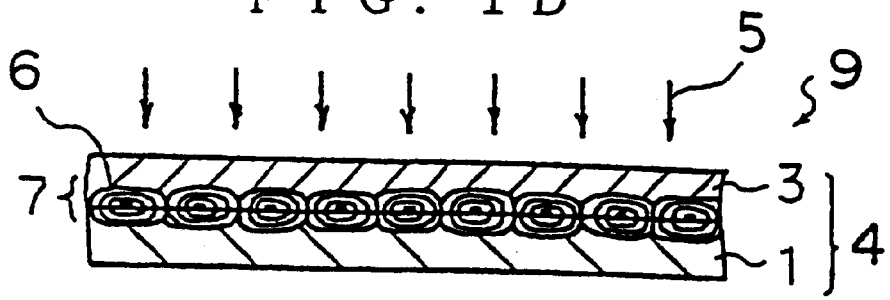

For instance, as shown in FIG. 1D, against a plurality of giant fullerenes 6 induced based on the ultra-fine particles 2 dispersed on an amorphous carbon support film 1, a beam 5 of further high energy is irradiated. The amorphous carbon surrounding the respective giant fullerenes 6 is activated. Thereby, the giant fullerenes 6 continue to grow to cause connection of the neighboring giant fullerenes 6. That is, carbon atoms at the most external shells of a plurality of neighboring giant fullerenes 6 are shared to form a coalesced body of the giant fullerenes 6.

Thus, by implementing the irradiation of the beam 5 of high energy for more than a certain prescribed time period, as shown in FIG. 1D, the giant fullerenes 6 in the laminated amorphous carbon base material 4 are connected together to form a film body therein. That is, a film of a giant fullerene 7 can be formed in the laminated amorphous carbon base material 4. The obtained film of a giant fullerene 7 is as described above basically based on the ultra-fine particle endohedral giant fullerene. Therefore, it can be said a film body of the ultra-fine particle endohedral giant fullerenes.

Figure 1E:
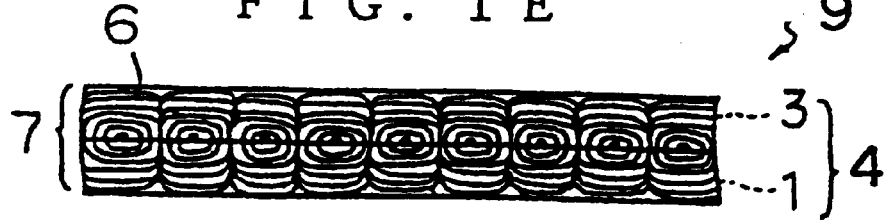

The position of formation of a film of a giant fullerene 7, as shown in FIG. 1D, is not restricted only in the neighborhood of the layer interface of the laminated amorphous carbon base material 4. A further irradiation of the beam 5 of high energy, as shown in FIG. 1E, can grow a film of a giant fullerene 7 almost all over the amorphous carbon support film 1 and the amorphous carbon cover layer 3. That is, a film of a giant fullerene 7 in which almost all of the amorphous carbon support film 1 and the amorphous carbon cover layer 3 is fullerene can be obtained.

Figure 2C:
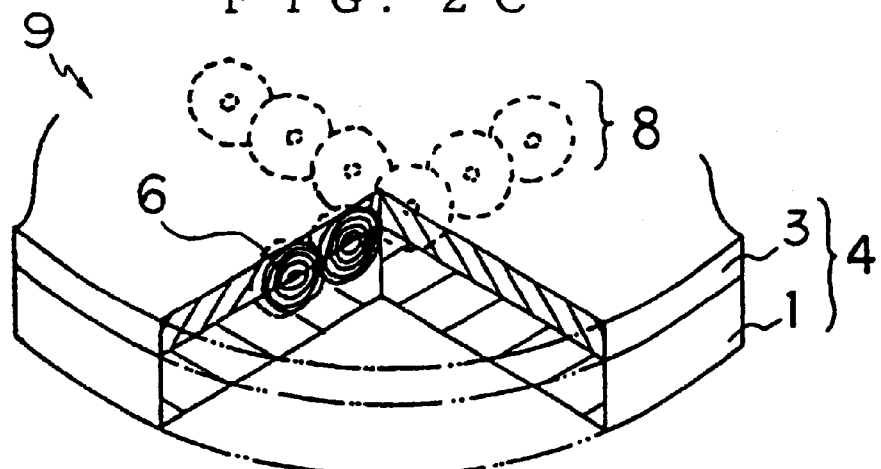

In addition, as shown in FIG. 2A and FIG. 2B, when ultra-fine particles 2 disposed in advance according to a desired pattern P are employed, a plurality of fullerenes can be connected (coalesced) according to the desired pattern P. That is, based on the ultra-fine particles 2 disposed in advance according to a desired pattern P, a plurality of giant fullerenes 6 are induced. By further irradiating the beam of high energy against this plurality of giant fullerenes 6, as shown in FIG. 2C, a giant fullerene continuum 8 of the desired pattern P is formed inside of the laminated amorphous carbon base material 4.

The aforementioned film of giant fullerene (a film continuum of giant fullerenes) 7 or patterned giant fullerene continuum 8 is formed inside of a laminated amorphous carbon base material 4 to be a giant fullerene containing structure 9. This giant fullerene containing structure is particularly effective when development of application is considered by making use of the property of the giant fullerene, in particular, the ultra-fine particle endohedral giant fullerene. That is, with the use of the giant fullerene containing structure 9, various kinds of operations and controls, and various kinds of development of application of the giant fullerenes (the ultra-fine particles endohedral giant fullerene) can be realized.

Then, in the present invention, by making use of irradiation time period, irradiation intensity and irradiation atmosphere of a beam 5 of high energy, and the size, disposition position and kind of the ultra-fine particles 2, the obtained giant fullerene continuum can be controlled in its property, shape or position of formation, or the state in the laminated amorphous carbon base material 4. Therefore, the range of application thereof covers a remarkably broader range. For instance, the aforementioned giant fullerene containing continuum 9, by making use of the characteristics of the giant fullerene and contact characteristics and quantum effect (quantum well, mini-band or the like) of the ultra-fine particles, has applicability in device materials such as electronic materials, sensor materials, filter materials or the like, and new function materials such as superconductor materials, bio-materials, medical materials or the like.

Next, specific embodiments of the present invention will be described.

EMBODIMENT 1

First, on an amorphous carbon support film consisting of i-carbon, a plurality of Pt ultra-fine particles are disposed. These ultra-fine particles of Pt are formed by use of transcription method in which a Pt mesh is employed. In specific, a Pt mesh having a lot of fine holes is disposed on the amorphous carbon support film that is then set on a room temperature stage in a vacuum chamber. Thereafter, onto inner walls of the fine holes of the Pt mesh, an Ar ion beam of an accelerating voltage of 3.0 kV and a beam current of 0.25 mA is irradiated from an oblique direction. An angle of incidence of the Ar ion beam is 40°, an atmosphere during bombardment of the Ar ion beam is a high vacuum as high as approximately $1 \times 10^{-3}$ Pa (including Ar). By use of the oblique bombardment of the Ar ion beam against the Pt mesh, a plurality of ultra-fine particles of Pt are disposed on the amorphous carbon support film. An average particle diameter of the ultra-fine particles of Pt is approximately 3 nm.

Next, on the amorphous carbon support film thereon a plurality of ultra-fine particles of Pt are disposed, so as to cover these plurality of ultra-fine particles of Pt, by the evaporation method making use of resistance heating, an amorphous carbon film of a thickness of 10 nm is deposited. That is, an amorphous carbon support film and an amorphous carbon film are laminated to form an amorphous carbon base material, and at the layer interface of the laminated amorphous carbon base material the plurality of ultra-fine particles of Pt are encapsulated.

The aforementioned laminated amorphous carbon base material is set on a room temperature stage in a vacuum chamber of a 200 kV TEM (Product of Nihon Denshi Co., JEM-2010). In a vacuum atmosphere of $1\times10^{-5}$ Pa, an electron beam of $1\times10^{20}$e/cm$^2$·sec is bombarded on the amorphous carbon film from the above thereof. After bombardment of the electron beam, upon observing the state of the laminated amorphous carbon base material with the TEM, it is confirmed that a plurality of concentric carbon textures are induced with the plurality of ultra-fine particles of Pt as their nucleation substance. The respective ultra-fine particles of Pt are incorporated in the concentric carbon textures that the ultra-fine particles induced respectively.

The concentric carbon textures, in the neighborhood of the interface of an amorphous carbon support film and an amorphous carbon film, are formed traversing on both of them. Since distances between the layers of these concentric carbon textures are approximately 0.35 nm, it is confirmed that they are onion-like graphites, a kind of giant fullerenes. Incidentally, the surroundings of the onion-like graphite are confirmed to maintain the state of amorphous carbon. Thus, a giant fullerene containing structure in which an ultra-fine particle endohedral giant fullerene is formed inside of the laminated amorphous carbon base material can be obtained.

Subsequently, to the laminated amorphous carbon base material an electron beam is bombarded further, and when the integrated bombardment time becomes 400 sec, the TEM observation is again carried out. As a result of this, as each onion-like graphite grows, a plurality of adjacent onion-like graphites are confirmed to join together to form a film structure. Thus, by bombarding an electron beam onto a laminated amorphous carbon base material therein a plurality of ultra-fine particles of Pt are placed in the neighborhood of layer interface, a film of giant fullerene can be formed inside thereof. That is, a giant fullerene containing structure that has a film of giant fullerene formed inside of a laminated amorphous carbon base material can be obtained.

Further, onto the aforementioned laminated amorphous carbon base material, in a vacuum atmosphere of $1\times10^{-5}$ Pa, an electron beam of $1\times10^{20}$e/cm$^2$·sec is bombarded, and when the integrated time of bombardment of the electron beam becomes 4000 sec, a TEM observation is carried out again. As a result of this, it is confirmed that a film of giant fullerene grows over almost all of the amorphous carbon film. Incidentally, instead of the ultra-fine particles of Pt disposed at the layer interface of the aforementioned embodiment 1, with ultra-fine particles of Au, Al and Al$_2$O$_3$, respectively, under the same condition an electron beam is bombarded onto the laminated amorphous carbon base material. As a result of this, similar ultra-fine particle endohedral giant fullerene, further a film of giant fullerene can be obtained.

On the other hand, for comparison purpose relating to the present invention, onto a laminated amorphous carbon base material therein no ultra-fine particle such as ultra-fine particles of Pt is not disposed, under the same condition as the aforementioned embodiment 1, an electron beam is bombarded. A giant fullerene is found not to form.

EMBODIMENT 2

Similarly as the aforementioned embodiment 1 except that as a target to dispose ultra-fine particles on an amorphous carbon support film by use of transcription method, a Cu target having such a shape as shown in FIG. 2 is employed, the ultra-fine particles of Cu are disposed on the amorphous carbon support film. These ultra-fine particles of Cu are confirmed to be disposed according to the shape of a slit thereof.

Next, on an amorphous carbon support film thereon a plurality of ultra-fine particles of Cu are disposed according to a pattern, as identical as embodiment 1, an amorphous carbon film is laminated. Thereafter, under the same condition as that of embodiment 1, an electron beam is bombarded on the amorphous carbon film from the above thereof. When the electron beam is bombarded for 400 sec, TEM observation is carried out. It is confirmed that a plurality of onion-like graphites is formed according to the pattern and these onion-like graphites are connected together. That is, a patterned giant fullerene continuum is formed inside the laminated amorphous carbon base material.

Thus, by controlling the initial disposition positions of the ultra-fine particles, various kinds of shapes of giant fullerene continuums can be formed inside the laminated amorphous carbon base material.

Industrial Applicability

According to the present invention, a fullerene containing structure in which a fullerene is formed inside of an amorphous carbon base material can be obtained. Further, state of formation such as shape or position of formation, a connection structure or the like of the fullerene that is formed can be controlled. Such a fullerene containing structure of the present invention contributes largely in development of application or protection of fullerene.

What is claimed is:

1. A fullerene containing structure, comprising:
    an amorphous carbon base having a first amorphous carbon layer and a second amorphous carbon layer laminated together; and
    a fullerene formed in the neighborhood of the layer interface of the first amorphous carbon layer and the second amorphous carbon layer and straddled the first and second amorphous carbon layers.

2. The fullerene containing structure as set forth in claim 1:
    wherein the fullerene is a giant fullerene.

3. The fullerene containing structure as set forth in claim 1:
    wherein the fullerene is an ultra-fine particle endohedral giant fullerene.

4. A fullerene containing structure, comprising:
    an amorphous carbon base having a first amorphous carbon layer and a second amorphous carbon layer laminated together; and
    a plurality of fullerenes formed in the neighborhood of layer interface of the first amorphous carbon layer and the second amorphous carbon layer and straddled the first and second amorphous carbon layers.

5. The fullerene containing structure as set forth in claim 4:
    wherein the fullerenes are giant fullerenes.

6. The fullerene containing structure as set forth in claim 4:
    wherein the fullerenes are ultra-fine particle endohedral giant fullerenes.

7. The fullerene containing structure as set forth in claim 4:
    wherein the fullerenes are connected to each other.

8. The fullerene containing structure as set forth in claim 4:
    wherein the fullerenes are connected to each other to form a film structure.

9. The fullerene containing structure as set forth in claim 4:
    wherein the fullerenes are connected to each other to form a desired pattern.

10. The fullerene containing structure as set forth in claim 7:
    wherein the fullerenes compose a giant fullerene coalesced body by sharing with carbon atoms at their external shells.

11. A manufacturing method of a fullerene containing structure, comprising:
    a step of disposing an ultra-fine particle on a first amorphous carbon layer;
    a step of laminating a second amorphous carbon layer on the first amorphous carbon layer so as to cover at least the ultra-fine particle; and
    a step of irradiating a high energy beam onto a laminate body of the first amorphous carbon layer and the second amorphous carbon layer having the ultra-fine particle at the layer interface of the first and second amorphous carbon layer, and generating a fullerene traversing the first and second amorphous carbon layers with the ultra-fine particle as nucleation substance.

12. The manufacturing method of a fullerene containing structure as set forth in claim 11:
    wherein the second amorphous carbon layer has a thickness in the range of from 5 to 100 nm.

13. The manufacturing method of a fullerene containing structure as set forth in claim 11:
    wherein an electron beam of an intensity of $1 \times 10^{19}$ e/cm$^2$·sec or more is irradiated onto the laminate body in a vacuum atmosphere of $1 \times 10^{-5}$ Pa or less.

14. The manufacturing method of a fullerene containing structure as set forth in claim 11:
    wherein an ultra-fine particle endohedral giant fullerene as the fullerene is generated.

15. A manufacturing method of a fullerene containing structure, comprising:
    a step of disposing a plurality of ultra-fine particles on a first amorphous carbon layer;
    a step of laminating a second amorphous carbon layer on the first amorphous carbon layer so as to cover at least the ultra-fine particles; and
    a step of irradiating a high energy beam onto a laminate body of the first amorphous carbon layer and the second amorphous carbon layer having the ultra-fine particles at the layer interface of the first and second amorphous carbon layer, and generating a plurality of fullerenes traversing the first and second amorphous carbon layer with the ultra-fine particles as nucleation substance.

16. The manufacturing method of a fullerene containing structure as set forth in claim 15, further comprising:
    a step of further irradiating the high energy beam on the generated fullerenes to grow and connect the fullerenes to each other.

17. The manufacturing method of a fullerene containing structure as set forth in claim 15:
    wherein the ultra-fine particles are disposed in dispersed manner on a surface of the first amorphous carbon layer.

18. The manufacturing method of a fullerene containing structure as set forth in claim 15:
    wherein the ultra-fine particles are disposed according to a desired pattern on a surface of the first amorphous carbon layer.

19. The manufacturing method of a fullerene containing structure as set forth in claim 15:
    wherein the second amorphous carbon layer has a thickness in the range of from 5 to 100 nm.

20. The manufacturing method of a fullerene containing structure as set forth in claim 15:
    wherein an electron beam of an intensity of $1 \times 10^{19}$ e/cm$^2$·sec or more is irradiated onto the laminate body in a vacuum atmosphere of $1 \times 10^{-5}$ Pa or less.

* * * * *